US012413029B2

(12) United States Patent
Yu et al.

(10) Patent No.: US 12,413,029 B2
(45) Date of Patent: Sep. 9, 2025

(54) ROTARY ELECTRICAL PLUG

(71) Applicant: NINGBO WELL ELECTRIC APPLIANCE CO., LTD., Ningbo (CN)

(72) Inventors: Guolin Yu, Ningbo (CN); Zhuoming Yu, Ningbo (CN)

(73) Assignee: NINGBO WELL ELECTRIC APPLIANCE CO., LTD., Ningbo (CN)

(*) Notice: Subject to any disclaimer, the term of this patent is extended or adjusted under 35 U.S.C. 154(b) by 319 days.

(21) Appl. No.: 18/202,436

(22) Filed: May 26, 2023

(65) Prior Publication Data

US 2024/0243533 A1 Jul. 18, 2024

(30) Foreign Application Priority Data

Jan. 16, 2023 (CN) ......................... 202320165241.6

(51) Int. Cl.
*H01R 24/30* (2011.01)
*H01R 35/04* (2006.01)
*H01R 103/00* (2006.01)

(52) U.S. Cl.
CPC ............ *H01R 24/30* (2013.01); *H01R 35/04* (2013.01); *H01R 2103/00* (2013.01)

(58) Field of Classification Search
CPC .... H01R 24/30; H01R 35/04; H01R 2103/00; H01R 39/64
See application file for complete search history.

(56) References Cited

U.S. PATENT DOCUMENTS

| | | | | |
|---|---|---|---|---|
| 5,775,921 A * | 7/1998 | Chou | H01R 24/28 | 439/21 |
| 7,575,436 B1 * | 8/2009 | Devlin | H01R 24/28 | 439/21 |
| 8,123,528 B2 * | 2/2012 | Devlin | H01R 35/04 | 439/21 |
| 2011/0045677 A1 * | 2/2011 | Devlin | H01R 35/04 | 439/21 |

* cited by examiner

*Primary Examiner* — Briggitte R. Hammond

(57) ABSTRACT

A rotary electrical plug is provided. The rotary electrical plug includes a rotary base, a first insert, a second insert, a first conductive connection lug, and a second conductive connection lug. The first insert and the second insert are circumferentially limited and mounted on the rotary base, the first insert is provided with a first conductive circular portion, the second conductive connection lug is provided with a second conductive circular portion, and the first conductive circular portion, the second conductive circular portion, and the rotary base are coaxial with each other. The first conductive connection lug is electrically connected to the first insert via the first conductive circular portion, and the second conductive connection lug is electrically connected to the second insert via the second conductive circular portion.

10 Claims, 13 Drawing Sheets

ROTARY ELECTRICAL PLUG

CROSS-REFERENCE TO RELATED APPLICATIONS

This application claims priority to Chinese patent application No. 202320165241.6, filed on Jan. 16, 2023, the content of which is hereby incorporated by reference in its entirety.

TECHNICAL FIELD

The present disclosure relates to the field of an electrical plug and an electrical socket, and in particular, to a rotary electrical plug.

BACKGROUND

An electrical plug is usually matched with an electrical socket, which enables an electronic product with the electrical plug to be energized.

At present, an insert of a conventional plug and a power cord are not rotatable. The electrical socket is usually mounted to the wall, and a location of a jack of the electrical socket is also fixed. However, in an actual application, a direction of the power cord may need to change in an external environment. The conventional electrical plug cannot change the direction of the power cord. Moreover, a thickness of the conventional electrical plug is large and extends outwardly from the wall, thereby preventing cabinets and other furniture from being placed in front of the plug.

SUMMARY

The present disclosure provides a rotary electrical plug to solve the above-mentioned problem.

The rotary electrical plug includes a rotary base, a first insert, a second insert, a first conductive connection lug, and a second conductive connection lug. The first insert and the second insert are circumferentially limited and mounted on the rotary base, the first insert is provided with a first conductive circular portion, the second conductive connection lug is provided with a second conductive circular portion, and the first conductive circular portion, the second conductive circular portion, and the rotary base are coaxial with each other.

The first conductive connection lug is electrically connected to the first insert via the first conductive circular portion, and the second conductive connection lug is electrically connected to the second insert via the second conductive circular portion.

In some embodiments, the rotary base is provided with a first groove, and the first conductive circular portion is disposed in the first groove and attached to a bottom surface of the first groove. The first insert is provided with a main portion, and the main portion of the first insert is vertically connected to the first conductive circular portion and penetrates through the rotary base.

In some embodiments, the second conductive circular portion is rotatably mounted to a periphery of the rotary base. A contact connection portion is defined by the second insert extending towards the second conductive circular portion, and the second insert is in contact with and cooperated with the second conductive circular portion via the contact connection portion.

In some embodiments, the rotary electrical plug further includes an inner frame. The rotary base is rotatably mounted on the inner frame. The inner frame abuts against the second conductive circular portion to support the second conductive connection lug.

In some embodiments, the rotary electrical plug further includes a collision member. The collision member is circumferentially limited and mounted on the rotary base and facing the inner frame, to control a collision between the collision member and the inner frame driven by the rotary base and produce a sound.

In some embodiments, the collision member includes an elastic body and a collision protrusion, and the collision protrusion is mounted on the elastic body. The inner frame is provided with convex ribs separated from each other sequentially on an inner circumferential wall thereof, a position interference portion is located between the convex ribs and the collision protrusion, and the elastic body is configured to elastically deform relative to the inner frame in response to pushing of the position interference portion, so as to enable the rotary base to drive the collision member to rotate relative to the inner frame.

In some embodiments, the rotary electrical plug further includes a shell, both the inner frame and the rotary base are mounted in the shell. The inner frame is provided with a rotary limiting portion, the shell is provided with a coordinating limiting portion, and the coordinating limiting portion of the shell is coordinated with the rotary limiting portion of the inner frame, so as to circumferentially limit the inner frame to the shell.

In some embodiments, the rotary electrical plug further includes a grounding pin and a third conductive connection lug. The grounding pin is circumferentially limited and mounted on the rotary base, the grounding pin is provided with a circular conductive portion, and a line perpendicular to a surface of the circular conductive portion and an axis of the rotary base are coaxial. The third conductive connection lug is electrically connected to the grounding pin via the circular conductive portion.

In some embodiments, the rotary base is further provided with a second groove and a center hole, and the center hole is in communication with the second groove, where the circular conductive portion is disposed; and the third conductive connection lug is capable of passing through the center hole and contacting and cooperating with the circular conductive portion.

In some embodiments, the rotary base is further provided with an extending convex column, which is disposed in an area where the second groove is located, and the extending convex column is inserted in the grounding pin, so as to circumferentially limit the grounding pin to the rotary base.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

In the figures, 100 represents a rotary electrical plug, 10 represents a rotary base, 11 represents a first groove, 111 represents a bottom surface of the first groove, 12 represents a limiting groove, 121 represents a groove wall, 13 represents a blocking protrusion, 14 represents a gap, 15 represents a second groove, 16 represents a center hole, 17 represents an extending convex column, 20 represents a first insert, 21 represents a first conductive circular portion, 22 represents a main portion of the first insert, 30 represents a second insert, 31 represents an insert connection portion, 40 represents a first conductive connection lug, 50 represents a second conductive connection lug, 51 represents a second conductive circular portion, 60 represents an inner frame, 61 represents a first slot, 62 represents a convex rib, 63 represents a rotary limiting portion, 70 represents a collision member, 71 represents an elastic body, 72 represents a collision protrusion, 80 represents a shell, 81 represents a lower cover, 811 represents a coordinating limiting portion, 82 represents an upper cover, 83 represents a screw, 91 represents a grounding pin, 911 represents a circular conductive portion, 92 represents a third conductive connection lug, 101 represents a power line, 1011 represents a net tail and rubber coating portion, and 102 represents a rotary carrier.

DETAILED DESCRIPTION

The present disclosure will now be described in detail with reference to the accompanying drawings and embodiments in order to make the objects, technical solutions, and advantages of the present disclosure clearer. It should be understood that the specific embodiments described herein are only for explaining the present disclosure, and not intended to limit the present disclosure.

It should be noted that when an element is considered to be "mounted on" another element, it can be directly on another element or there may be a centered element. When an element is considered to be "disposed on" another element, it can be disposed directly on another element or there may be a centered element at the same time. When an element is considered to be "fixed to" another element, it can be directly fixed to another element, or there may be a centered element.

Unless otherwise defined, all technical and scientific terms used herein have the same meaning as a skilled person in the art would understand. The terms used in the specification of the present disclosure are only for the purpose of describing specific embodiments and are not intended to limit the present disclosure. The term "and/or" as used herein may include any and all combinations of one or more of the relevant listed items.

A rotary electrical plug 100 provided in the present disclosure refers to a plug that complies with the American National Standard specifically.

Figure 2:
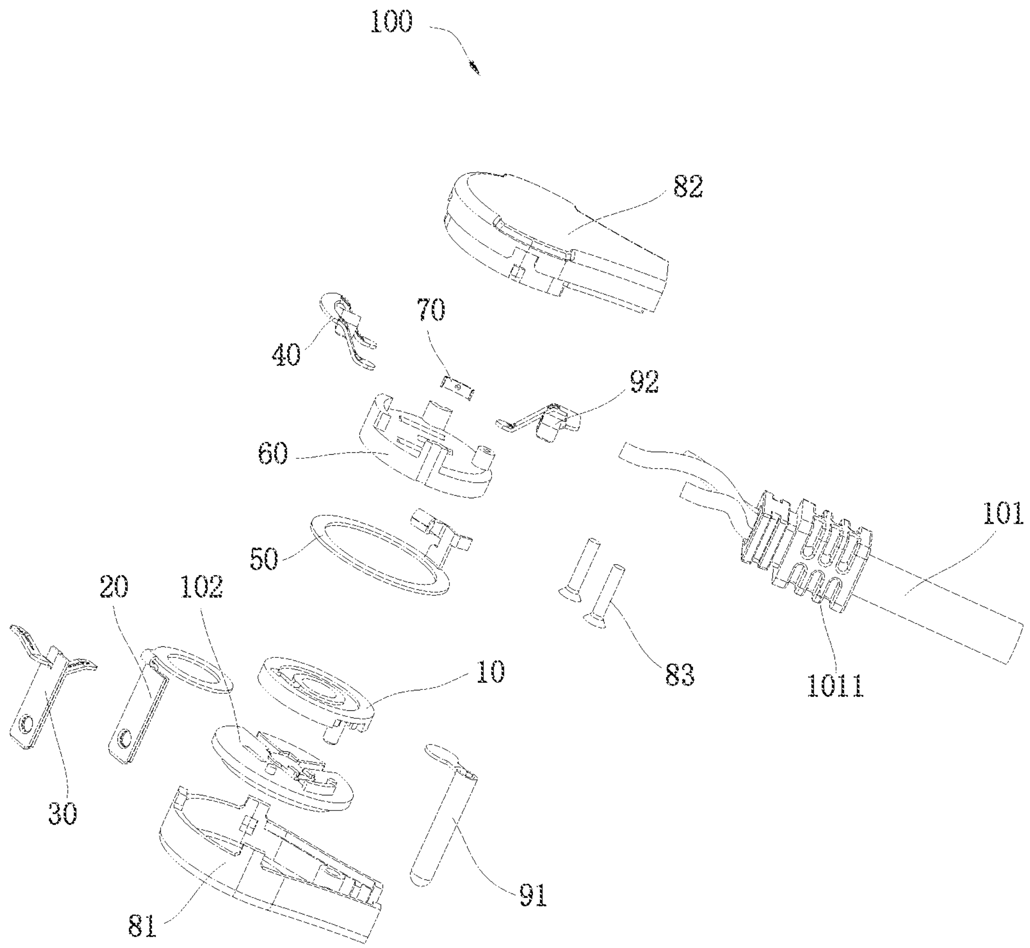
FIG. 2 is an exploded diagram of a rotary electrical plug in an embodiment of the present disclosure.
Figure 7:
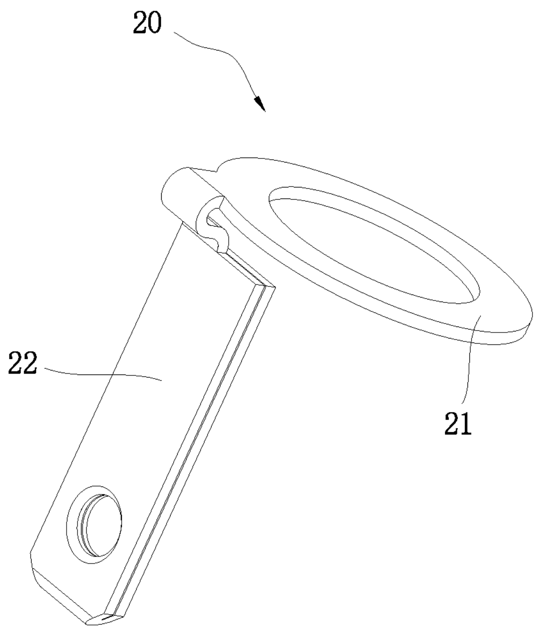
FIG. 7 is a schematic diagram of a first insert in an embodiment of the present disclosure.
Figure 9:
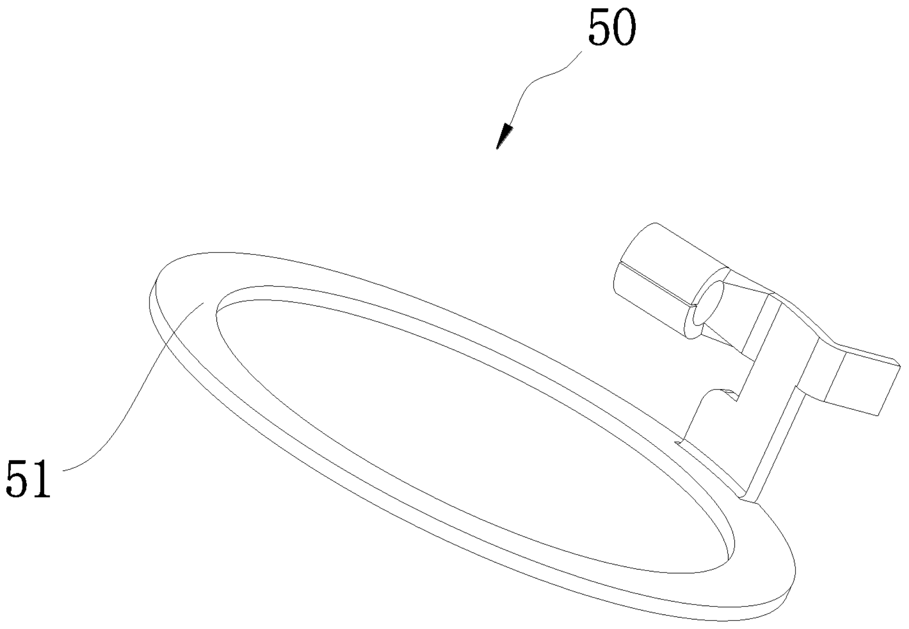
FIG. 9 is a schematic diagram of a second conductive connection lug in an embodiment of the present disclosure.

Referring to FIG. 2, FIG. 7, and FIG. 9, the rotary electrical plug 100 provided in an embodiment of the present disclosure includes a rotary base 10, a first insert 20, a second insert 30, a first conductive connection lug 40, and a second conductive connection lug 50. The first insert 20 and the second insert 30 are circumferentially limited and mounted on the rotary base 10, the first insert 20 is provided with a first conductive circular portion 21, the second conductive connection lug 50 is provided with a second conductive circular portion 51, and the first conductive circular portion 21, the second conductive circular portion 51, and the rotary base 10 are coaxial with each other. The first conductive connection lug 40 is corresponding to the first insert 20, the first conductive connection lug 40 is electrically connected to the first insert 20 via the first conductive circular portion 21, the second conductive connection lug 50 is corresponding to the second insert 30, and the second conductive connection lug 50 is electrically connected to the second insert 30 via the second conductive circular portion 51.

That is, the rotary electrical plug 100 may apply structural features of the first conductive circular portion 21 and the second conductive circular part 51, so that the rotary electrical plug 100 may ensure a rotation of the first insert 20 and the second insert 30 relative to the rotary electrical plug 100 on the basis of electrical conductivity of the first insert 20 and the second insert 30. A direction of a power line 101 of the rotary electrical plug 100 may be changed to mate the rotary electrical plug 100 with the electrical socket mating. Meanwhile, the first conductive circular portion 21 may be integrated in the first insert 20, and the second conductive circular portion 51 may be integrated in the second conductive connection lug 50, so as to facilitate arrangement of the first insert 20, the second insert 30, the first conductive connection lug 40 and the second conductive connection lug 50 in the rotary electrical plug 100. Internal space of the rotary electrical plug 100 may be made full use, which plays a role in reducing an overall thickness of the rotary electrical plug 100.

It should be noted that the first insert 20 may be a zero-wire insert, the second insert 30 may be a fire-wire insert specifically. For one skilled in the art, the first insert 20 may be the fire-wire insert, the second insert 30 may be the zero-wire insert.

Figure 6:
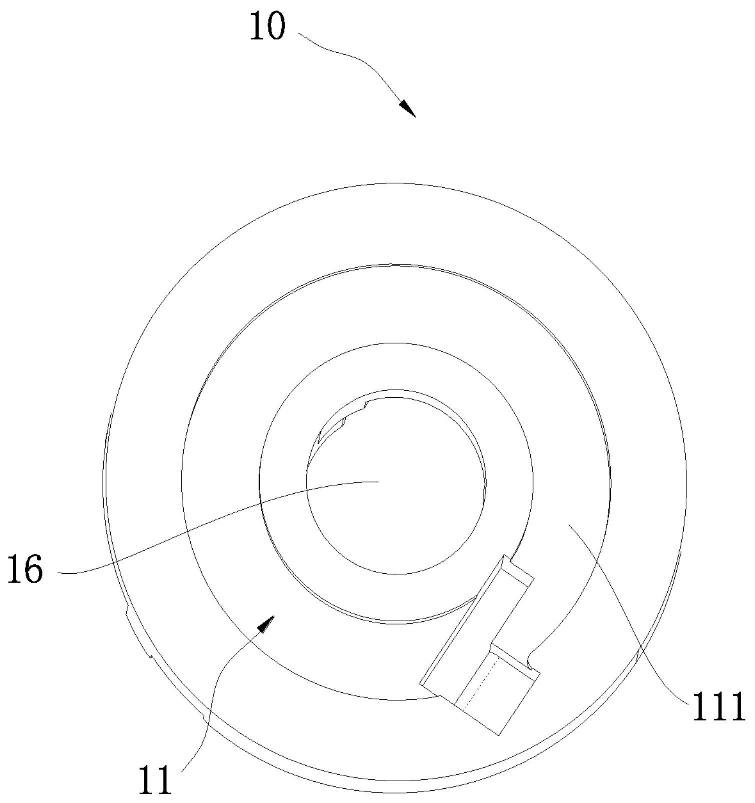
FIG. 6 is a schematic diagram of the rotary base in another view in an embodiment of the present disclosure.

Referring to FIG. 6 and FIG. 7, in an embodiment, the rotary base 10 may be provided with a first groove 11, and the first conductive circular portion 21 may be disposed in the first groove 11 and attached to a bottom surface 111 of the first groove 11. The first insert 20 may be provided with a main portion 22, and the main portion 22 of the first insert 20 may be vertically connected to the first conductive circular portion 21 and penetrate through the rotary base 10. This specifically may enable assembly of the first insert 20 on the rotary base 10, and the assembly of the first insert 20 on the rotary base 10 may be limited by the fit between the first conductive circular portion 21 and the bottom surface 111 of the first groove 11, and the main portion 22 of the first insert 20 penetrating through the rotating base 10.

The first groove 11 may match the first conductive circular portion 21. Specifically, the first groove 11 may be a circular groove, so as to reduce an area of the first groove 11, and thus play a role in reducing a size of the rotary base 10. The first groove 11 may also be a groove in other shapes, a diameter of which is greater than that of the first conductive circular portion 21, such as an avoiding oval shape, or an irregular shape.

Figure 3:
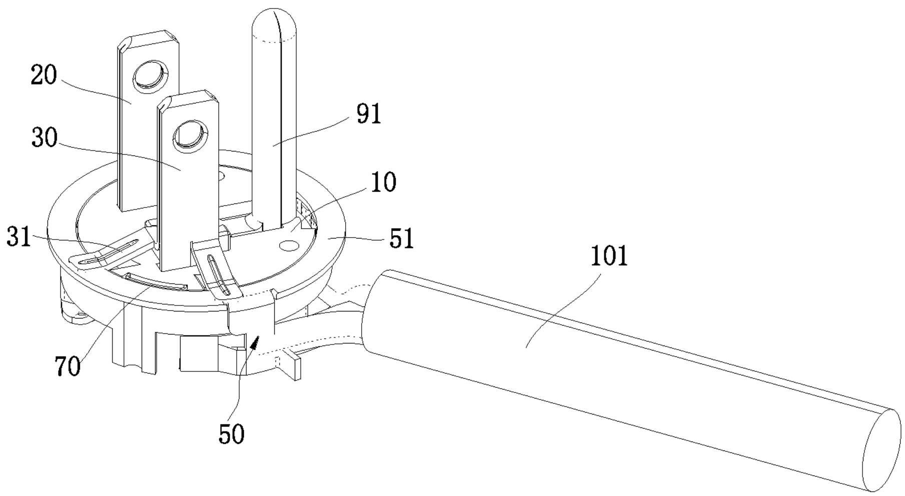
FIG. 3 is a schematic diagram of a partial structure of a rotary electrical plug in an embodiment of the present disclosure.
Figure 4:
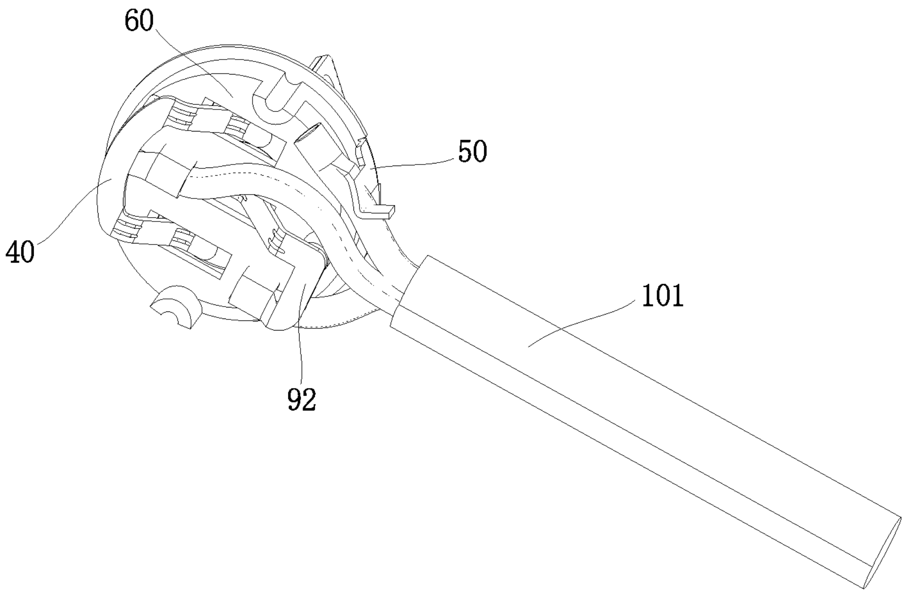
FIG. 4 is a schematic diagram of the partial structure of the rotary electrical plug in another view in an embodiment of the present disclosure.

Referring to FIG. 3 and FIG. 4, in an embodiment, the second conductive circular portion 51 may be rotatably mounted to a periphery of the rotary base. A contact connection portion 31 may be defined by the second insert 30 extending towards the second conductive circular portion 51, and the second insert 30 is in contact with and cooperated with the second conductive circular portion 51 via the contact connection portion 31. In this way, an assembly of the second conductive connection lug 50 and the second insert 30 on the rotary base 10 may be realized.

Figure 8:
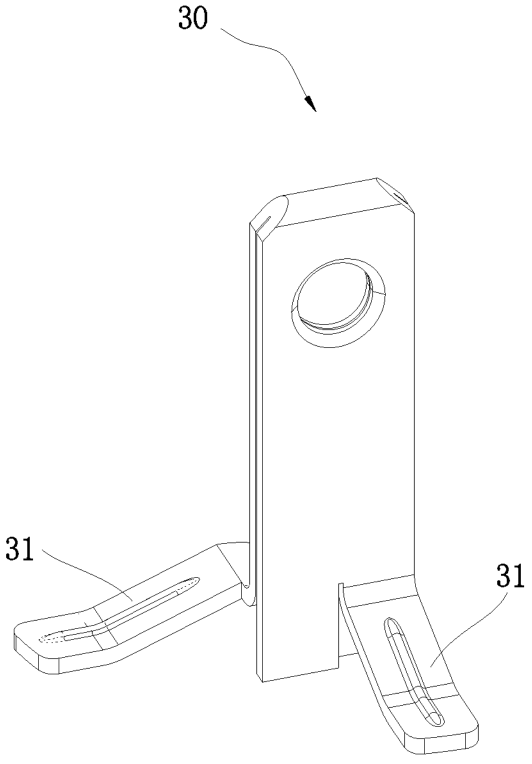
FIG. 8 is a schematic diagram of a second insert in an embodiment of the present disclosure.

Referring to FIG. 8, the number of the contact connection portion 31 may be more than one, such as two. Two contact connection portions 31 are capable of abutting against the rotary base 10 and in contact with the second conductive circular portion 51, respectively, so as to ensure an electrical connection between the second insert 30 and the second conductive connection lug 50.

Figure 5:
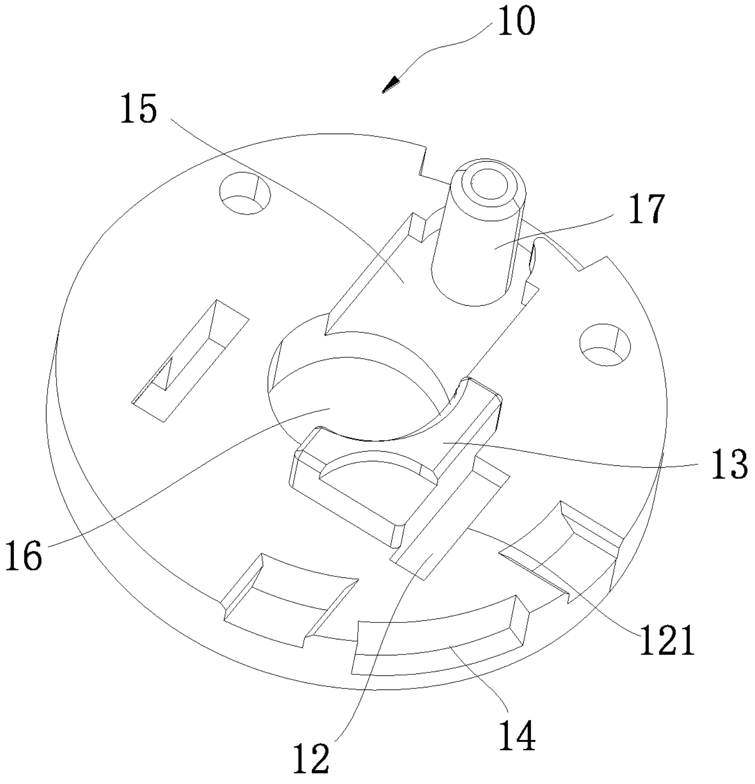
FIG. 5 is a schematic diagram of a rotary base in an embodiment of the present disclosure.

Referring to FIG. 5, the rotary base 10 may be further provided with a limiting groove 12 and a blocking protrusion 13 matched with the second insert 30. The second insert 30 may be partially inserted into the limiting groove 12, and abut against the blocking protrusion 13. The circumferential and restrictive mounting of the second insert 30 on the rotary base 10 may be realized by the abutment among the second insert 30, the blocking protrusion 13, and a groove wall 121 of the limiting groove 12.

Referring to FIG. 2, the rotary electrical plug 100 may further include an inner frame 60. The rotary base 10 is rotatably mounted on the inner frame 60. The inner frame 60 may abut against the second conductive circular portion 51 to support the second conductive connection lug 50. In other words, the inner frame 60 is configured to support the rotary 10 and the second conductive connection lug 50 in the rotary electrical plug 100, resulting in realizing assembly of the rotary base 10 and the second conductive connection lug 50 in the rotary electrical plug 100.

Figure 10:
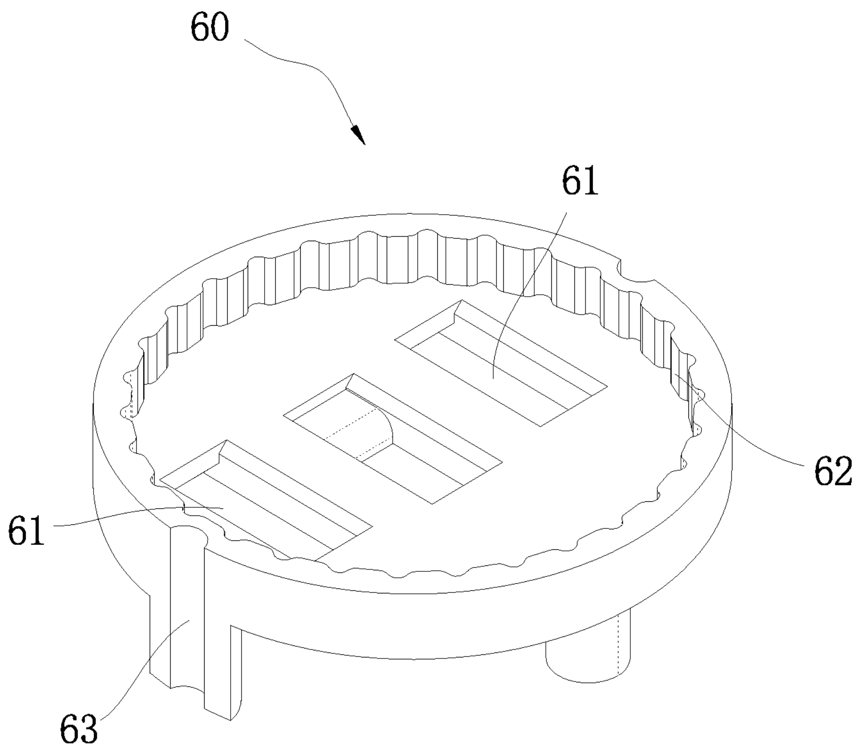
FIG. 10 is a schematic diagram of an inner frame in an embodiment of the present disclosure.

Referring to FIG. 10, the inner frame 60 may be provided with a first slot 61, and the first conductive connection lug 40 is capable of penetrating through the first slot 61 and in contact with the first conductive circular portion 21 on the first insert 20. The number of the first conductive connection lug 40 in contact with the first conductive circular portion 21 corresponds to the number of the first slot 61, and a width of the first slot 61 may be less than a width of the first conductive circular portion 21, to facilitate limiting the first conductive circular part 21 on the rotary base 10 by the inner frame 60.

Referring to FIG. 2, in an embodiment, the rotary electrical plug 100 may further include a collision member 70. The collision member 70 may be circumferentially limited and mounted on the rotary base 10 and facing the inner frame 60. The collision member 70 is configured to control a collision between the collision member 70 and the inner frame 60 driven by the rotary base 10 and generate a sound. In other words, the rotary electrical plug 100 in the rotation may accompany with the sound, so as to improve an intuitive feeling of the user when using the rotating plug 100.

Figure 11:
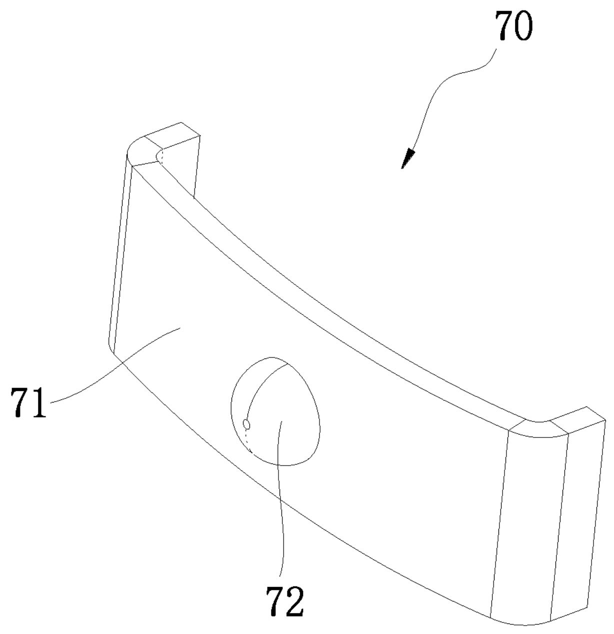
FIG. 11 is a schematic diagram of a collision member in an embodiment of the present disclosure.

Referring to FIG. 10 and FIG. 11, the collision member 70 may include an elastic body 71 and a collision protrusion 72, and the collision protrusion 72 may be mounted on the elastic body 71. The inner frame 60 may be provided with convex ribs 62 separated from each other sequentially on an inner circumferential wall thereof, a position interference portion may be located between the convex ribs 62 and the collision protrusion 72, and the elastic body 71 is configured to elastically deform relative to the inner frame in response to pushing of the position interference portion, so as to enable the rotary base 10 to drive the collision member 70 to rotate relative to the inner frame 60. In other words, the collision member 70 is capable of generating a sound by a collision between the collision protrusion 72 and the convex ribs 62. The elastic body 71 is capable of elastically deforming driven by the collision protrusion 72, so that the collision protrusion 72 may smoothly overcome the blockage of the convex ribs 62. For every rotation of the rotary base 10, the collision protrusion 72 of the collision member 70 may collide with the convex ribs 62 of the inner frame 60 and generate the sound. Specifically, a clattering sound similar to that of a mechanical watch. It should be noted that the collision member 70 may be a resilient metal sheet. In order to realize the assembly of the collision member 70 on the rotary base 10, the rotary base 10 may be provided with a gap 14 matched with the collision member 70, so that the rotary base 10 may drive the collision member 70 to rotate relative to the inner frame 60.

Figure 12:
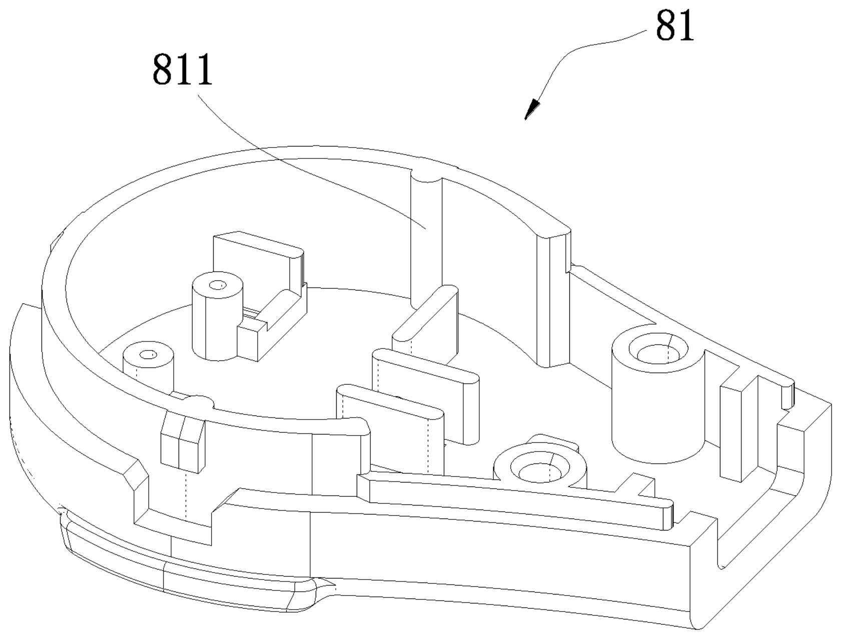
FIG. 12 is a schematic diagram of a lower cover in an embodiment of the present disclosure.

Referring to FIG. 10 and FIG. 12, the rotary electrical plug 100 may further include a shell 80, both the inner frame 60 and the rotary base 10 may be mounted in the shell 80. The inner frame 60 may be provided with a rotary limiting portion 63, the shell 80 may be provided with a coordinating limiting portion 811, and the coordinating limiting portion 811 of the shell 80 may be coordinated with the rotary limiting portion 63 of the inner frame 60, so as to circumferentially limit the inner frame 60 to the shell 80. In this way, the use requirement of assembly of the inner frame 60 in the rotary electrical plug 100 may be realized.

Figure 1:
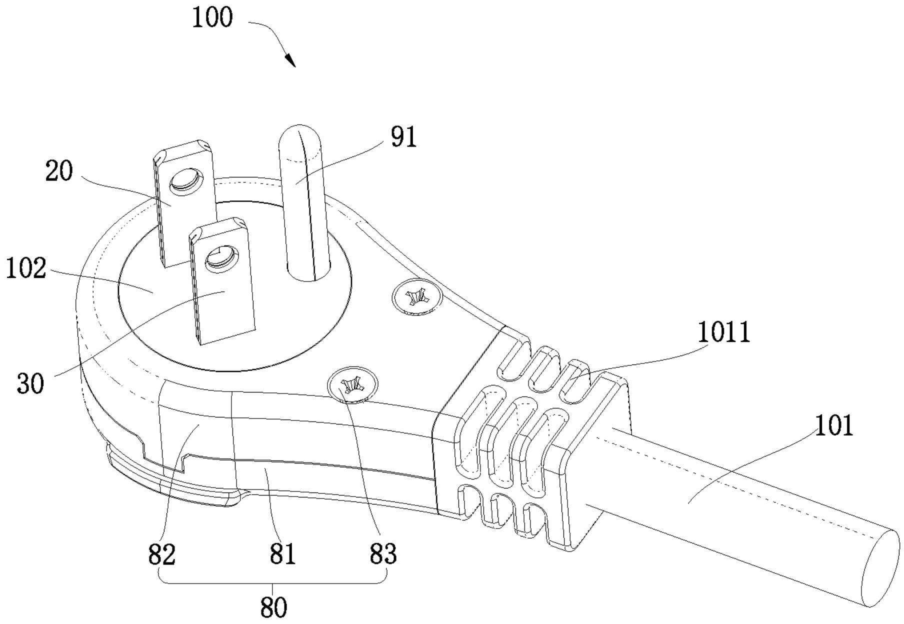
FIG. 1 is a schematic diagram of a rotary electrical plug in an embodiment of the present disclosure.

Referring to FIG. 1, the shell 80 may include a lower cover 81 and an upper cover 82. The upper cover 82 may be mounted to the lower cover 81 by means of clamping, and then fixed with a screw 83. The coordinating limiting portion 811 may be specifically located on the lower cover 81.

It should be noted that the coordination between the coordinating limiting portion 811 and the rotary limiting portion 63 may be specifically a concave-convex coordination. The number of the rotary limiting portion 63 may be two, and two rotary limiting portions 63 may be located at both sides of the inner frame 60, which will not be elaborated herein.

Figure 13:
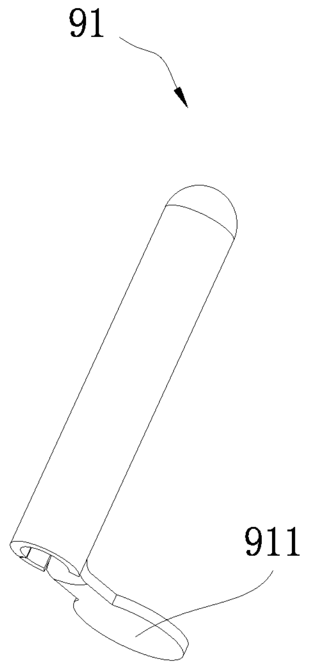
FIG. 13 is a schematic diagram of a grounding pin in an embodiment of the present disclosure.

Referring to FIG. 2 and FIG. 13, the rotary electrical plug 100 may further include a grounding pin 91 and a third conductive connection lug 92. The grounding pin 91 may be circumferentially limited and mounted on the rotary base 10. The grounding pin 91 may be provided with a circular conductive portion 911, and a line perpendicular to a surface of the circular conductive portion 911 and an axis of the rotary base 10 are coaxial. The third conductive connection lug 92 may be corresponding to the grounding pin 91, and the third conductive connection lug 92 may be electrically connected to the grounding pin 91 via the circular conductive portion 911. In this way, the rotary electrical plug 100 may have a grounding function, and the circular conductive portion 911 of the grounding pin 91 may be in contact with the third conductive connection lug 92 to meet the requirement of rotation of the rotary electrical plug 100 as a whole.

It should be noted that all of the grounding pin 91, the third conductive connection lug 92, the first insert 20, the first conductive connection lug 40, the second insert 30, and the second conductive connection lug 50 may be bent by hardware copper one-piece molding, with greater strength than that of a conventional structure, better conductivity and contact, and less resistance.

Referring to FIG. 5, in an embodiment, the rotary base 10 may further include provided with a second groove 15 and a center hole 16, and the center hole 16 may be in communication with the second groove 15, where the circular conductive portion 911 is disposed. The third conductive connection lug 92 is capable of passing through the center hole 16 and contacting and cooperating with the circular conductive portion 911. In this way, the grounding pin 91 may be connected to the rotary base 10, so that the grounding pin 91 may be assembled on the rotary base 10 in a limited position.

The rotary base 10 may be further provided with an extending convex column 17, which may be disposed in an area where the second groove 15 is located, and the extending convex column 17 may be inserted in the grounding pin 91, so as to circumferentially limit the grounding pin 91 to the rotary base 10. In this way, circumferential restriction of the grounding pin 91 on the rotary base 10 may be realized.

Referring to FIG. 1, it should be noted that the rotary electrical plug 100 may further include a rotary carrier 102. The rotary carrier 102 may cover on the rotary base 10, and the first insert 20, the second insert 30, and grounding pin 91 on the rotary base 10 can penetrate through the rotary carrier 102 and extend out of the shell 80. The power line 101 of the rotary electrical plug 100 extending out of the shell 80 may be provided with a net tail and rubber coating portion 1011 in the injection molding, and the net tail and rubber coating portion 1011 may abut against the shell 80, so that the abutting cooperation between the net tail and rubber coating portion 1011 and the shell 80 may enable the rotary electrical plug 100 to successfully pass a swing test.

In summary, the rotary electrical plug 100 provided in the present disclosure may achieve a rotary function. The direction of the power line 101 of the rotary electrical plug 100 may be changed to mate the rotary electrical plug 100 with the electrical socket mating. Meanwhile, the rotary electrical plug 100 may make full use of the internal space of the rotary electrical plug 100, which plays a role in reducing the overall thickness of the rotary electrical plug 100.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A rotary electrical plug, comprising a rotary base, a first insert, a second insert, a first conductive connection lug, and a second conductive connection lug, wherein the first insert and the second insert are circumferentially limited and mounted on the rotary base, the first insert is provided with a first conductive circular portion, the second conductive connection lug is provided with a second conductive circular portion, and the first conductive circular portion, the second conductive circular portion, and the rotary base are coaxial with each other; and the first conductive connection lug is electrically connected to the first insert via the first conductive circular portion, and the second conductive connection lug is electrically connected to the second insert via the second conductive circular portion.

2. The rotary electrical plug of claim 1, wherein the rotary base is provided with a first groove, and the first conductive circular portion is disposed in the first groove and attached to a bottom surface of the first groove;

wherein the first insert is provided with a main portion, and the main portion of the first insert is vertically connected to the first conductive circular portion and penetrates through the rotary base.

3. The rotary electrical plug of claim 1, wherein the second conductive circular portion is rotatably mounted to a periphery of the rotary base; and a contact connection portion is defined by the second insert extending towards the second conductive circular portion, and the second insert is in contact with and cooperated with the second conductive circular portion via the contact connection portion.

4. The rotary electrical plug of claim 1, further comprising an inner frame, wherein the rotary base is rotatably mounted on the inner frame, and the inner frame abuts against the second conductive circular portion to support the second conductive connection lug.

5. The rotary electrical plug of claim 4, further comprising a collision member, wherein the collision member is circumferentially limited and mounted on the rotary base and facing the inner frame, to control a collision between the collision member and the inner frame driven by the rotary base and produce a sound.

6. The rotary electrical plug of claim 5, wherein the collision member comprises an elastic body and a collision protrusion, and the collision protrusion is mounted on the elastic body; and the inner frame is provided with convex ribs separated from each other sequentially on an inner circumferential wall thereof, a position interference portion is located between the convex ribs and the collision protrusion, and the elastic body is configured to elastically deform relative to the inner frame in response to pushing of the position interference portion, so as to enable the rotary base to drive the collision member to rotate relative to the inner frame.

7. The rotary electrical plug of claim 4, further comprising a shell, wherein both the inner frame and the rotary base are mounted in the shell; and the inner frame is provided with a rotary limiting portion, the shell is provided with a coordinating limiting portion, and the coordinating limiting portion of the shell is coordinated with the rotary limiting portion of the inner frame, so as to circumferentially limit the inner frame to the shell.

8. The rotary electrical plug of claim 1, further comprising a grounding pin and a third conductive connection lug, wherein the grounding pin is circumferentially limited and mounted on the rotary base, the grounding pin is provided with a circular conductive portion, and a line perpendicular to a surface of the circular conductive portion and an axis of the rotary base are coaxial; and the third conductive connection lug is electrically connected to the grounding pin via the circular conductive portion.

9. The rotary electrical plug of claim 8, wherein the rotary base is further provided with a second groove and a center hole, and the center hole is in communication with the second groove, where the circular conductive portion is disposed; and the third conductive connection lug is capable of passing through the center hole and contacting and cooperating with the circular conductive portion.

10. The rotary electrical plug of claim 9, wherein the rotary base is further provided with an extending convex column, which is disposed in an area where the second groove is located, and the extending convex column is inserted in the grounding pin, so as to circumferentially limit the grounding pin to the rotary base.

* * * * *